(12) United States Patent
Kim et al.

(10) Patent No.: US 10,581,069 B2
(45) Date of Patent: Mar. 3, 2020

(54) NEGATIVE ELECTRODE ACTIVE MATERIAL HAVING DOUBLE COATING LAYER, METHOD FOR PREPARING THE SAME AND LITHIUM SECONDARY BATTERY INCLUDING THE SAME

(71) Applicant: LG Chem, Ltd., Seoul (KR)

(72) Inventors: Hyun Wook Kim, Daejeon (KR); Eun Kyung Kim, Daejeon (KR); Sang Wook Woo, Daejeon (KR)

(73) Assignee: LG Chem, Ltd. (KR)

( * ) Notice: Subject to any disclaimer, the term of this patent is extended or adjusted under 35 U.S.C. 154(b) by 75 days.

(21) Appl. No.: 15/034,666

(22) PCT Filed: Aug. 26, 2015

(86) PCT No.: PCT/KR2015/008945
§ 371 (c)(1),
(2) Date: May 5, 2016

(87) PCT Pub. No.: WO2016/032240
PCT Pub. Date: Mar. 3, 2016

(65) Prior Publication Data
US 2017/0170465 A1     Jun. 15, 2017

(30) Foreign Application Priority Data
Aug. 26, 2014    (KR) .................. 10-2014-0111502

(51) Int. Cl.
     *H01M 4/13*      (2010.01)
     *H01M 4/60*      (2006.01)
     (Continued)

(52) U.S. Cl.
CPC ............. *H01M 4/366* (2013.01); *C01B 32/05* (2017.08); *H01M 4/1393* (2013.01);
(Continued)

(58) Field of Classification Search
None
See application file for complete search history.

(56) References Cited

U.S. PATENT DOCUMENTS 5,358,805 A    10/1994   Fujimoto et al.
6,391,495 B1     5/2002   Choi et al.
(Continued)

FOREIGN PATENT DOCUMENTS

KR          100318377 B1    12/2001
KR       20110138621 A    12/2011
(Continued)

OTHER PUBLICATIONS

Written Opinion of the International Searching Authority from PCT/KR2015/008945, dated Nov. 26, 2015.
(Continued)

*Primary Examiner* — Cynthia H Kelly
*Assistant Examiner* — Julian Anthony
(74) *Attorney, Agent, or Firm* — Lerner, David, Littenberg, Krumholz & Mentlik, LLP

(57) ABSTRACT

The present invention relates to a negative electrode active material having a double coating layer of a first coating layer and a second coating layer, which has an excellent output property, effectively suppresses a side reaction with an electrolyte liquid, particularly a PC-containing electrolyte liquid, and has excellent electric conductivity, a method for manufacturing the same, a negative electrode including the same, and a lithium secondary battery including the negative electrode. The negative electrode active material according to the present invention is capable of effectively preventing a side reaction with an electrolyte liquid, particularly a PC-containing electrolyte liquid, and is capable of improving electric conductivity, and as a result, enhancing a rate determining property by reducing an OCV drop of a lithium (Continued)

secondary battery including the negative electrode active material, and enhancing a high rate property.

20 Claims, 3 Drawing Sheets

(51) Int. Cl.
    *H01M 4/58*     (2010.01)
    *H01M 4/82*     (2006.01)
    *H01M 6/00*     (2006.01)
    *H01M 4/36*     (2006.01)
    *H01M 4/587*     (2010.01)
    *H01M 4/1393*     (2010.01)
    *C01B 32/05*     (2017.01)
    *H01M 4/62*     (2006.01)
    *H01M 10/0525*     (2010.01)
    *H01M 4/02*     (2006.01)

(52) U.S. Cl.
    CPC ........... *H01M 4/587* (2013.01); *H01M 4/625* (2013.01); *H01M 10/0525* (2013.01); *H01M 2004/027* (2013.01); *Y02T 10/7011* (2013.01)

(56) References Cited

U.S. PATENT DOCUMENTS

| | | | | |
|---|---|---|---|---|
| 6,482,547 | B1* | 11/2002 | Yoon | H01M 4/133 429/218.1 |
| 8,029,931 | B2* | 10/2011 | Im | H01M 4/133 429/231.8 |
| 8,846,271 | B2* | 9/2014 | Oshihara | H01M 4/8807 429/523 |
| 2011/0274979 | A1* | 11/2011 | Sheem | H01M 4/133 429/231.8 |
| 2012/0177995 | A1* | 7/2012 | Sun | B82Y 30/00 429/231.8 |
| 2013/0089782 | A1 | 4/2013 | Seung et al. | |
| 2013/0309578 | A1 | 11/2013 | Umeno et al. | |
| 2013/0344392 | A1* | 12/2013 | Huang | H01M 4/366 429/231.8 |
| 2014/0134521 | A1 | 5/2014 | Naito et al. | |
| 2014/0227588 | A1 | 8/2014 | Kim et al. | |
| 2016/0036049 | A1* | 2/2016 | Wang | H01M 4/366 429/229 |
| 2016/0329559 | A1* | 11/2016 | Cairns | C01B 17/24 |

FOREIGN PATENT DOCUMENTS

| | | |
|---|---|---|
| KR | 20120139631 A | 12/2012 |
| KR | 20130034182 A | 4/2013 |
| KR | 20130107892 A | 10/2013 |
| KR | 20130142148 A | 12/2013 |
| KR | 20140099987 A | 8/2014 |

OTHER PUBLICATIONS

International Search Report from PCT/KR2015/008945, dated Nov. 26, 2015.

\* cited by examiner

NEGATIVE ELECTRODE ACTIVE MATERIAL HAVING DOUBLE COATING LAYER, METHOD FOR PREPARING THE SAME AND LITHIUM SECONDARY BATTERY INCLUDING THE SAME

CROSS-REFERENCE TO RELATED APPLICATION

This application is a national phase entry under 35 U.S.C. § 371 of International Application No. PCT/KR2015/008945, filed Aug. 26, 2015, which claims priority to Korean Patent Application 10-2014-0111502, filed Aug. 26, 2014, the disclosures of which are incorporated herein by reference.

FIELD OF THE INVENTION

The present invention relates to a negative electrode active material having a double coating layer of a first coating layer and a second coating layer, which has an excellent output property, effectively suppresses a side reaction with an electrolyte liquid, particularly a PC-containing electrolyte liquid, and has excellent electric conductivity, a method for preparing the same, a negative electrode including the same, and a lithium secondary battery including the negative electrode.

DESCRIPTION OF THE RELATED ART

Since the discovery of electricity in the eighteen hundreds, batteries have developed from batteries having a low operating voltage to batteries having a high operating voltage, and from primary batteries to secondary batteries until now.

Among various batteries, lithium secondary batteries have led $21^{st}$ century battery technologies, and have received attention as an energy storage system from various portable devices to electric vehicles.

A lithium secondary battery is an energy storage device storing electric energy in the battery while lithium moves from a negative electrode to a positive electrode during discharge, and lithium ions move from a positive electrode to a negative electrode when charging. Lithium secondary batteries have high energy density and have a small degree of self-discharge compared to other batteries and therefore, have been widely used across various industries.

Meanwhile, a lithium secondary battery includes an electrode assembly including a positive electrode including a positive electrode active material capable of lithium ion intercalation/deintercalation, a negative electrode including a negative electrode active material capable of lithium ion intercalation/deintercalation, and a microporous separator provided between the positive electrode and the negative electrode, and a non-aqueous electrolyte containing lithium ions.

As a positive electrode active material of a lithium secondary battery, transition metal oxides such as lithium cobalt oxide ($LiCoO_2$), lithium-manganese-based oxide ($LiMn_2O_4$) or lithium-nickel oxide ($LiNiO_2$), and complex oxides in which some of these transition metals are substituted with other transition metals are used.

As a negative electrode active material, lithium metal is used, however, when lithium metal is used, battery short circuits may occur due to dendrite formation causing a risk of explosion, and recently, lithium metal is being replaced by carbon-based materials.

As carbon-based materials used as a negative electrode active material of a lithium secondary battery, crystalline carbon such as natural graphite and artificial graphite, and amorphous carbon such as soft carbon and hard carbon are used.

Amorphous carbon has an advantage of high capacity, but has a disadvantage of large irreversibility during charge and discharge.

Natural graphite, typical crystalline carbon, is inexpensive, and has excellent initial capacity and relatively high theoretical limit capacity, but has a plate shape and therefore, are flatly compressed and oriented on a collector when prepared into a pole plate leading to difficult electrolyte liquid immersion, and accordingly, is disadvantageous in that a high rate charge and discharge property is inferior, life deterioration is severe, and a cycle property declines. Accordingly, methods of mechanically globularizing plate-shaped natural graphite, or mixing with other graphite have been proposed, however, there are problems in that graphite surface crack occurs when roll pressed, or a side reaction with an electrolyte liquid increases due to an exposure of a graphite edge plane, which leads to a cycle property or swelling property decline. In addition, methods of using artificial graphite have been studied, however, these also have a disadvantage of being vulnerable to an electrolyte liquid (particularly a PC-containing electrolyte liquid), and having a declined output property.

In view of the above, the inventors of the present invention have studied on negative electrode active materials having excellent output property and cycle property and having excellent electric conductivity while having excellent stability by having tolerance for a side reaction with an electrolyte liquid, particularly a PC-containing electrolyte liquid, and while carrying out the study, have prepared a negative electrode active material forming a first coating layer including an amorphous carbon material on a graphite core having excellent output property and cycle property and forming a second coating layer including nitrogen-doped fine carbon particles on the first coating layer, and have identified that a lithium secondary battery using the negative electrode active material has an excellent output property and a reduced OCV drop, and have completed the present invention.

DISCLOSURE OF THE INVENTION

Technical Problem

An object of the present invention is to provide a negative electrode active material including a graphite core; a first coating layer including an amorphous carbon material formed on the core; and a second coating layer including nitrogen-doped fine carbon particles formed on the first coating layer, which has an excellent output property, effectively suppresses a side reaction with an electrolyte liquid, particularly a PC-containing electrolyte liquid, and has excellent electric conductivity.

Another object of the present invention is to provide a method for preparing the negative electrode active material.

Still another object of the present invention is to provide a negative electrode including the negative electrode active material.

Moreover, still another object of the present invention is to provide a lithium secondary battery including the negative electrode, a positive electrode, and a separator provided between the negative electrode and the positive electrode.

Technical Solution

In view of the above, one aspect of the present invention provides a negative electrode active material including a graphite core; a first coating layer including an amorphous carbon material formed on the graphite core; and a second coating layer including nitrogen-doped fine carbon particles formed on the first coating layer, wherein the first coating layer and the second coating layer bind to each other by electrostatic attraction.

Another aspect of the present invention provides a method for preparing the negative electrode active material including preparing graphite with a first coating layer formed thereon by coating a graphite core with an amorphous carbon material precursor and heat treating the result (step 1); preparing a graphite mixture with a second coating layer formed on the first coating layer by adding the first coating layer-formed graphite and nitrogen-doped fine carbon material particles to an aqueous alkaline solution and mixing the result (step 2); and heat treating the graphite mixture (step 3).

Still another aspect of the present invention provides a negative electrode including the negative electrode active material.

Moreover, still another aspect of the present invention provides a lithium secondary battery including the negative electrode, a positive electrode, and a separator provided between the negative electrode and the positive electrode.

Advantageous Effects

A negative electrode active material having a first coating layer and a second coating layer according to the present invention is capable of effectively preventing a side reaction with an electrolyte liquid, particularly a PC-containing electrolyte liquid, by the first coating layer formed on a graphite core, and as a result, a phenomenon of an OCV drop of a lithium secondary battery including the negative electrode active material can be reduced, and accordingly, a rate determining property can be enhanced.

In addition, the negative electrode active material is capable of enhancing electric conductivity by the second coating layer formed on the first coating layer, and is capable of enhancing a high rate property of a lithium secondary battery including the negative electrode active material.

Moreover, a method for preparing the negative electrode active material of the present invention binds a first coating layer and a second coating layer through electrostatic attraction and thereby is capable of forming the second coating layer on the first coating layer thinly and uniformly using a simple method.

Consequently, the negative electrode active material according to the present invention and the method for preparing the same can be useful in industries requiring a negative electrode active material, for example, a lithium secondary battery industry.

DESCRIPTION OF DRAWINGS

The drawings accompanied in the present specification illustrate preferred embodiments of the present invention, and perform a role of further illuminating technological ideas of the present invention together with the contents of the invention described above, and accordingly, the present invention is not to be interpreted limiting to those described in the drawings.

MODE FOR CARRYING OUT THE INVENTION

Figure 1:
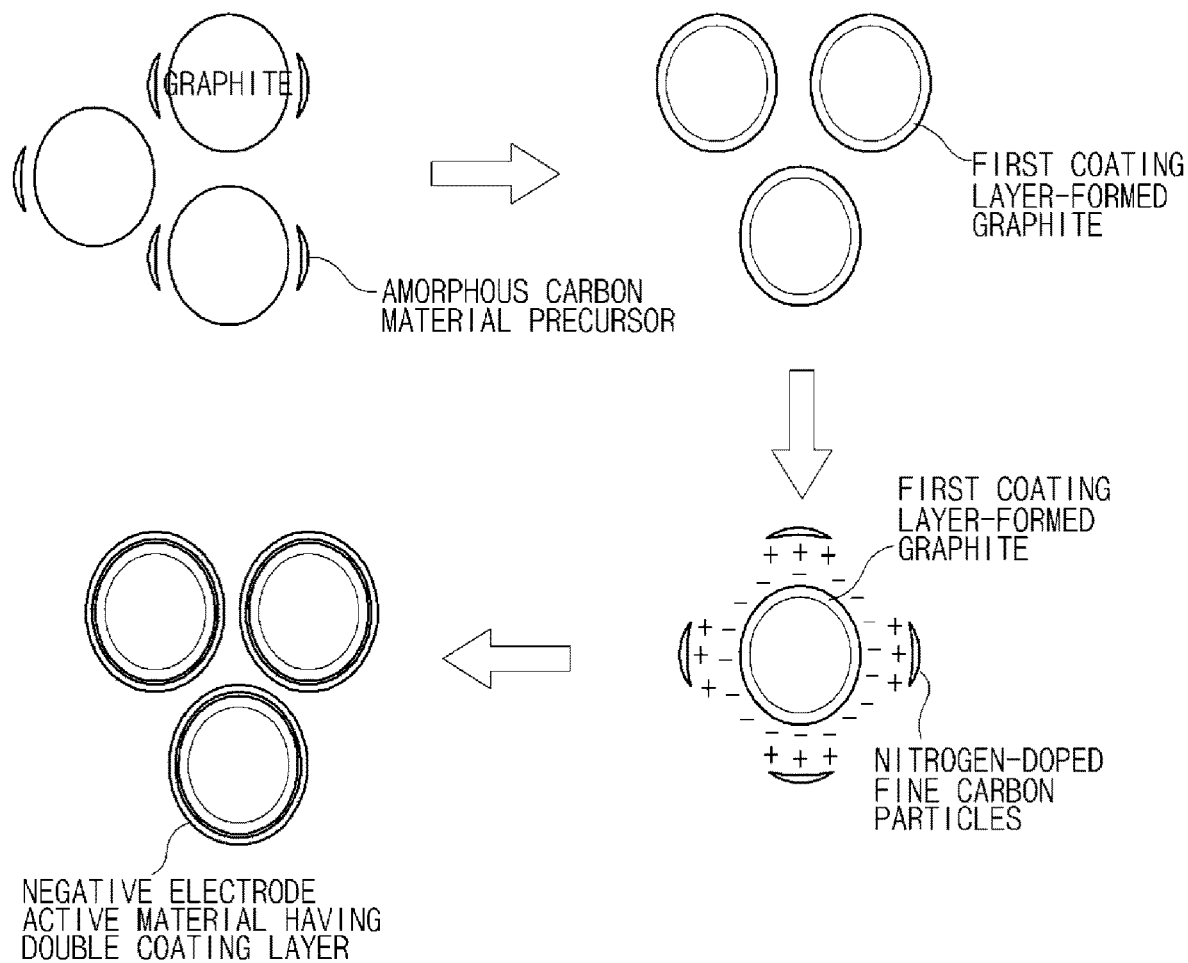
FIG. 1 is a diagram schematically showing a process for preparing a negative electrode active material having a double coating layer of a first coating layer and a second coating layer according to one embodiment of the present invention.

Hereinafter, the present invention will be described in more detail in order to illuminate the present invention.

Terms or words used in the present specification and the claims are not to be interpreted limitedly to common or dictionary definitions, and shall be interpreted as meanings and concepts corresponding to technological ideas of the present invention based on a principle in which the inventors may suitably define the concepts of terms in order to describe the invention in the best possible way.

The present invention provides a negative electrode active material having a double coating layer of a first coating layer and a second coating layer capable of enhancing electric conductivity while suppressing a side reaction between graphite and an electrolyte liquid by preventing an exposure of an edge plane of the graphite.

The negative electrode active material according to one embodiment of the present invention includes a graphite core; a first coating layer including an amorphous carbon material formed on the graphite core; and a second coating layer including nitrogen-doped fine carbon particles formed on the first coating layer, wherein the first coating layer and the second coating layer bind to each other by electrostatic attraction.

Graphite forming the graphite core is widely used as a material of a negative electrode active material due to an excellent cycle property and a favorable output property, but has a disadvantage in that initial efficiency is low due to degradation caused by a side reaction with an electrolyte liquid, particularly a propylene carbonate (PC)-containing electrolyte liquid, since an edge plane is highly exposed. Accordingly, the present invention prevents an exposure of the edge plane by coating the graphite core with a first coating layer including an amorphous carbon material to be described below, and therefore, is capable of enhancing stability by suppressing a side reaction while maintaining an excellent cycle property and an excellent output property graphite itself has, and also enhancing electric conductivity by forming a second coating layer including nitrogen-doped fine carbon particles on the first coating layer.

The graphite core may be artificial graphite, natural graphite or a combination thereof, and in other words, the graphite core may be formed with crystalline graphite.

Meanwhile, a shape of the graphite core is not particularly limited, but may be a globular shape.

The globular shape may be prepared using a globularization method commonly known in the art with the graphite core as a raw material. For example, the globular shape may be prepared by applying mechanical treatment such as shock compression, friction or shearing force to the raw material, and particles forming the graphite core being bent or mixed to be cut at the corner.

The mechanical treatment may be carried out using a globularization device commonly known in the art, and examples thereof may include pulverizers such as a counter jet mill (Hosokawa Micron, JP), an ACM pulverizer (Hosokawa Micron, JP) and a current jet (Nissin, JP), granulaters such as a SARARA (Kawasaki Heavy Industries, Ltd, JP), a GRANUREX (Freund Corporation, JP), a Newgramachine (Seichin, JP) and an AcroMaster (Hosokawa Micron, JP), kneaders such as a dispersion kneader and 2-roll, compression cutting-type processers such as a mechano-micro system, an extruder, a ball mill, a planetary mill, a mechano-fusion system, Nobilta, hydridization and a rotating ball mill.

The graphite core may have an average particle diameter ($D_{50}$) of 8 μm to 20 μm, and may be included in 91% by weight to 98% by weight with respect to the total weight of the negative electrode active material. When the graphite core has an average particle diameter in the above-mentioned range, the first coating layer may be sufficiently uniformly formed on the core surface, and when the graphite core is included in the above-mentioned content range, an output property and a cycle property of a lithium secondary battery using a negative electrode active material including the graphite core may be excellent.

As described above, the first coating layer including an amorphous carbon material may perform a role of suppressing a side reaction between the graphite core and an electrolyte liquid (particularly a PC-containing electrolyte liquid) by being formed on the graphite core and effectively preventing an exposure of an edge plane of the graphite core, and the first coating layer is preferably formed surrounding an outer surface of the graphite core.

A coating amount of the first coating layer may be greater than 1% by weight and less than or equal to 6% by weight, and the coating amount may be calculated through the following Mathematical Formula 1. When a coating amount of the first coating layer including an amorphous carbon material is in the above-mentioned range, an exposure of the edge plane may be effectively prevented, and a cycle property and an output property of a lithium secondary battery including the first coating layer as a negative electrode active material are excellent, battery stability may also be enhanced, and a rate determining property may be excellent since a phenomenon of an OCV drop is reduced. Meanwhile, when a coating amount of the first coating layer is greater than 6%, an amount of the amorphous carbon material with respect to the graphite core increases, and the first coating layer is formed thickly, and as a result, problems may occur in that a lithium secondary battery including the first coating layer as a negative electrode active material is difficult to be readily charged and discharged, and capacity of the lithium secondary battery decreases due to an absolute volume decrease of space in a negative electrode into which lithium is inserted when the battery is charged.

[Mathematical Formula 1]

$$\text{COATING AMOUNT}(\%) = \frac{\text{WEIGHT OF FIRST COATING LAYER}}{\text{WEIGHT OF FIRST COATING LAYER FORMED GRAPHITE CORE}} \times 100$$

The amorphous carbon material may be derived from a carbon precursor including one or more types selected from the group consisting of sucrose, a phenol resin, a naphthalene resin, polyvinyl alcohol, polyvinyl chloride, furfuryl alcohol, polyacrylonitrile, polyamide, a furan resin, cellulose, styrene, polyimide, an epoxy resin, coal-based pitch, petroleum-based pitch, mesophase pitch, tar and low molecular weight heavy oil.

The amorphous carbon material may have an average particle diameter ($D_{50}$) of 4 μm to 9 μm, a specific surface area of 7 m$^2$/g to 15 m$^2$/g, and average lattice plane spacing $d_{002}$ of 0.3470 to 0.3520. Herein, the average lattice plane spacing $d_{002}$ represents interplanar spacing of (002) surface by X-ray diffraction. When the amorphous carbon material has an average particle diameter in the above-mentioned range, uniform coating may be carried out on the natural graphite surface, and an agglomeration phenomenon may be prevented. Meanwhile, when the amorphous carbon material has an average particle diameter of less than 4 μm, frictional force between particles decreases making uniform coating difficult, and when the average particle diameter is greater than 9 μm, coating may be difficult.

The second coating layer including nitrogen-doped fine carbon particles may be formed on the first coating layer as described above and is capable of enhancing electric conductivity, and may be formed surrounding the first coating layer.

A coating amount of the second coating layer may be greater than 1% and less than or equal to 3%, and when a coating amount of the second coating layer including nitrogen-doped fine carbon particles is in the above-mentioned range, electric conductivity of a negative electrode active material including the second coating layer may be effectively enhanced. Meanwhile, when a coating amount of the second coating layer is greater than 3%, the second coating layer is thickly formed, which greatly decreases initial efficiency of a lithium secondary battery including the second coating layer as the negative electrode active material, and capacity degradation may rapidly occur due to a specific surface area increase when a long term cycle progresses. Herein, the coating amount may be calculated in the same manner as the method described above.

In addition, the nitrogen-doped fine carbon particles may have a positive charge (+) on the surface by the doped nitrogen, and accordingly, may bind to the first coating layer having a negative charge (−) by electrostatic attraction in an aqueous alkaline solution as described below. The nitrogen is preferably doped in 3 mol % to 7 mol % with respect to carbon atoms of the fine carbon particles. When the nitrogen is doped in less than 3 mol %, the fine carbon particles do not have a sufficient positive charge (+), and may not bind to the first coating layer by electrostatic attraction, and when doped in greater than 7 mol %, the second coating layer including the fine carbon particles is formed on the first coating layer in excess, which may lead to an initial efficiency decrease of a lithium secondary battery including the nitrogen-doped fine carbon particles as a negative electrode active material. The fine carbon particles may be graphene, carbon nanotubes or a combination thereof. Preferably, the fine carbon particles may be graphene or carbon nanotubes.

The graphene may be a specific surface area of 80 $m^2/g$ to 120 $m^2/g$ and electron mobility of 1500 S/cm to 3000 S/cm, and the carbon nanotubes may have a specific surface area of 35 $m^2/g$ to 50 $m^2/g$, an average diameter of 50 nm to 200 nm, and an average major axis length of 500 nm to 3 µm.

In addition, the present invention provides a method for preparing a negative electrode active material having a double coating layer formed with the first coating layer and the second coating layer.

The method for preparing the negative electrode active material according to one embodiment of the present invention includes preparing graphite with a first coating layer formed thereon by coating a graphite core with an amorphous carbon material precursor and heat treating the result (step 1); preparing a graphite mixture with a second coating layer formed on the first coating layer by adding the first coating layer-formed graphite and nitrogen-doped fine carbon material particles to an aqueous alkaline solution and mixing the result (step 2); and heat treating the graphite mixture (step 3).

The step 1 is a step of coating an amorphous carbon material precursor on a graphite core to place the amorphous carbon material precursor on the graphite core, and heat treating the result for forming a first coating layer including an amorphous carbon material on a graphite core.

Specifically, the first coating layer including an amorphous carbon material may be formed by carbonizing the amorphous carbon material precursor through coating the amorphous carbon material precursor on the graphite core and heat treating the result.

The coating is not particularly limited and may be carried out using methods commonly known in the art, and may be carried out using, for example, kneaders such as 2-roll, mechanical methods such as a blade, a mechano-micro system, an extruder, a ball mill, a planetary mill, a mechano-fusion system, Nobilta, hydridization and a rotating ball mill, spray dry methods, emulsion methods, or the like.

The heat treatment may be carried out in a temperature range of 700° C. to 1500° C. When the heat treatment is carried out in the above-mentioned temperature range, micropores of the graphite core may be maintained, and the amorphous carbon material precursor may be sufficiently carbonized. Herein, the graphite core is as described above, and the amorphous carbon material precursor may be the same material as the carbon precursor described above.

The step 2 is a step of adding the first coating layer-formed graphite and nitrogen-doped fine carbon particles to an aqueous alkaline solution and mixing the result for preparing a graphite mixture with a second coating layer formed on the first coating layer-formed graphite core prepared in the step 1, that is, on the first coating layer.

Specifically, by adding the first coating layer-formed graphite and nitrogen-doped fine carbon particles to an aqueous alkaline solution and mixing the result, the first coating layer having a negative charge (−) and nitrogen-doped fine carbon material particles having a positive charge (+) bind to each other by electrostatic attraction, and consequently, the second coating layer may be uniformly formed on the first coating layer.

The aqueous alkaline solution preferably has a pH of 8 to 9. In other words, the step 2 may be carried out under an atmosphere of pH 8 to pH 9. When the pH is less than 8, the first coating layer may not readily have a negative charge (−), and when the pH is greater than 9, the second coating layer may not readily have a positive charge (+), and as a result, the first coating layer and the second coating layer may not bind to each other through electrostatic attraction.

Meanwhile, the nitrogen-doped fine carbon particles are either prepared by injecting ammonia gas during fine carbon particle synthesis carried out through chemical vapor deposition (CVD) (method 1), or prepared by adding the fine carbon particles to a strong acid solution to oxidize the particles, and then reducing the particles by adding a reducing agent (method 2).

Specifically, when the nitrogen-doped fine carbon particles are prepared using the method 1, the nitrogen-doped fine carbon particles may be prepared from the beginning by injecting a certain amount of ammonia gas when initially synthesizing fine carbon particles. For example, the nitrogen-doped fine carbon particles may be obtained by injecting ammonia gas in a specific ratio when forming fine carbon particles through injecting reaction gas ($C_2H_2$, $CH_4$, $C_2H_4$, $C_2H_5$, CO and the like) after depositing a metal catalyst readily adsorbing carbon such as iron (Fe), nickel (Ni), cobalt (Co) and copper (Cu) on silicon (Si), silica ($SiO_2$) or a glass substrate using a thermal deposition method or a sputtering method. Herein, the ammonia gas may be injected in a volume ratio of 9:1 to 8:2 (reaction gas:ammonia gas) with respect to the reaction gas.

When the nitrogen-doped fine carbon particles are prepared using the method 2, fine carbon particles prepared using a method commonly known in the art are added to a strong acidic solution to prepare oxidized fine carbon particles, and the oxidized fine carbon particles are reduced again by adding a reducing agent to prepare the nitrogen-doped fine carbon particles. Herein, the strong acidic solution is not particularly limited, and for example, may be an aqueous sulfuric acid solution, and the reducing agent is not particularly limited as long as it is a reducing material containing nitrogen, and for example, may be hydrazine, ammonia or a mixture thereof.

In addition, heat treatment may be further carried out in a temperature range of 800° C. to 1200° C. after the reduction, and the reduction may be more readily accomplished thereby.

The step 3 is a step of heat treating the graphite mixture prepared in the step 2 for preparing a negative electrode active material having the first coating layer and the second coating layer.

The heat treatment may be carried out in a temperature range of 800° C. to 1000° C. When the heat treatment temperature is less than 800° C., the aqueous alkaline solution and impurities may not be readily removed, and the heat treatment temperature being greater than 1000° C. may affect crystallinity of the graphite core.

Moreover, the present invention provides a negative electrode including the negative electrode active material.

The negative electrode according to one embodiment of the present invention may be prepared by applying negative electrode slurry including the negative electrode active material on a negative electrode collector, and drying and roll pressing the result.

The negative electrode collector may generally use those having a thickness of 3 µm to 500 µm, and is not particularly limited as long as it has high conductivity without inducing chemical changes in the corresponding battery. For example, stainless steel, aluminum, nickel, titanium, baked carbon, or aluminum or stainless steel of which surface is treated with carbon, nickel, titanium, silver or the like, may be used.

The negative electrode active material slurry may be prepared by adding a binder, a conductor, and additives such as a filler and a dispersion agent to the negative electrode active material, and mixing the result.

The binder is a component assisting binding of the negative electrode active material and the conductor, and binding to the negative electrode collector, and may be normally added in 1% by weight to 30% by weight based on the total weight of the negative electrode active material. Such a binder is not particularly limited, and those commonly known in the art, and examples thereof may include one type or a mixture of two or more types selected from the group consisting of a vinylidene fluoride-hexafluoropropylene copolymer (PVBF-co-HEP), polyvinylidene fluoride, polyacrylonitrile, polymethyl methacrylate, polyvinyl alcohol, carboxymethylcellulose (CMC), starch, hydroxypropylcellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, styrene-butadiene rubber (SBR) and fluorine rubber.

The conductor may be normally added in 0.05% by weight to 5% by weight based on the total weight of the negative electrode active material. Such a conductor is not particularly limited as long as it has conductivity without inducing a side reaction with other components of a battery, and examples thereof may include graphite such as natural graphite or artificial graphite; carbon black such as carbon black (super-p), acetylene black, Ketjen black, channel black, furnace black, lamp black or thermal black; conductive fiber such as carbon fiber or metal fiber; metal powder such as fluorocarbon, aluminum or nickel powder, conductive whiskers such as zinc oxide or potassium titanate; conductive metal oxides such as titanium oxide; conductive materials such as polyphenylene derivatives, and the like.

The filler is a component suppressing expansion of a negative electrode, which may be used as necessary, and is not particularly limited as long as it is a fibrous material that does not induce chemical changes in the corresponding battery, and examples thereof may include olefin-based polymers such as polyethylene or polypropylene; or a fibrous material such as glass fiber or carbon fiber.

The dispersion agent (dispersion liquid) is not particularly limited, and examples thereof may include isopropyl alcohol, N-methylpyrrolidone (NMP), acetone and the like.

The coating may be carried out using methods commonly known in the art, and for example, may be carried out by distributing the negative electrode active material slurry on a top surface of one side of the negative electrode collector, and then uniformly dispersing the slurry using a doctor blade and the like. In addition to this method, methods such as die casting, comma coating and screen printing may be used.

The drying is not particularly limited, but may be carried out within one day in a vacuum oven at 50° C. to 200° C.

Moreover, the present invention provides a lithium secondary battery including the negative electrode, a positive electrode, a separator provided between the negative electrode and the positive electrode, and an electrolyte. The positive electrode of the present invention may be prepared by, for example, applying a mixture of a positive electrode active material, a conductor and a binder on a positive electrode collector, and drying the result, and as necessary, a filler may be further added to the mixture.

The positive electrode active material is not limited as long as it is commonly used in the art, and examples thereof may include a compound substituted with a layer compound such as lithium cobalt oxide ($LiCoO_2$) or lithium nickel oxide ($LiNiO_2$) or with one or more transition metals; lithium manganese oxide ($LiMnO_2$); lithium copper oxide ($Li_2CuO_2$); vanadium oxide; nickel site-type lithium nickel oxide (lithiated nickel oxide); a compound having a lithium intercalation material as a main component such as lithium manganese complex oxide, disulfide compound, or a complex oxide formed by a combination thereof.

The positive electrode collector may be the same as or included in the negative electrode collector described above.

The binder, the conductor, and the additives such as a filler and a dispersion agent used in the positive electrode may be the same as or included in those used for preparing the negative electrode described above.

The separator may be an insulating thin film having high ion permeability and mechanical strength, and may generally have a pore diameter of 0.01 μm to 10 μm and a thickness of 5 μm to 300 μm. As such a separator, a porous polymer film, for example, a porous polymer film prepared with a polyolefin-based polymer such as an ethylene homopolymer, a propylene homopolymer, an ethylene/butene copolymer, an ethylene/hexene copolymer and an ethylene/methacrylate copolymer may be used either alone or as laminates thereof, or common porous non-woven fabrics, for example, non-woven fabrics made of high melting point glass fiber or polyethylene terephthalate fiber may be used, however, the separator is not limited thereto.

In addition, the electrolyte is not particularly limited, and may include an organic solvent and a lithium salt commonly used in an electrolyte.

An anion of the lithium may be one or more types selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_6PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

Typical examples of the organic solvent may include one or more types selected from the group consisting of propylene carbonate, ethylene carbonate, diethyl carbonate, dimethyl carbonate, ethylmethyl carbonate, methylpropyl carbonate, dipropyl carbonate, dimethyl sulfoxide, acetonitrile, dimethoxyethane, diethoxyethane, vinylene carbonate, sulfolane, gamma-butyrolactone, propylene sulfite and tetrahydrofuran.

Particularly, ethylene carbonate and propylene carbonate, a cyclic carbonate, may be preferably used among the carbonate-based organic solvents, since they have a high dielectric constant as highly viscous organic solvents, and readily dissociate a lithium salt in an electrolyte, and when such cyclic carbonate and linear carbonate having low viscosity and a low dielectric constant such as dimethyl carbonate and diethyl carbonate are mixed in a proper ratio and used, an electrolyte liquid having high electric conductivity is capable of being prepared, which is more preferable.

In addition, for improving a charge and discharge property, a flame retarding property and the like, the electrolyte may further include, as necessary, pyridine, triethyl phosphite, triethanolamine, cyclic ether, ethylene diamine, n-glyme, hexanoic acid triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride and the like. In some cases, a halogen-containing solvent such as carbon tetrachloride or ethylene trifluoride may be further added for providing nonflammability, and carbon dioxide gas may be further included for enhancing a high temperature storage property, and fluoro-ethylene carbonate (FEC), propene sultone (PRS), fluoro-propylene carbonate (FPC) and the like may be further included.

The lithium secondary battery of the present invention may be manufactured by forming an electron assembly by disposing a separator between a positive electrode and a negative electrode, placing the electrode assembly inside a cylinder-type battery case or a square-type battery case, and then injecting an electrolyte into the case. Alternatively, the lithium secondary battery of the present invention may also be manufactured by laminating the electrode assembly, immersing the electrode assembly into an electrolyte, and placing the obtained result in a battery case and sealing the result.

As the battery case used in the present invention, those commonly used in the art may be selected, and an appearance of the lithium secondary battery is not limited by the use, and may include a cylinder-type, a square-type, a pouch-type or a coin-type using a can, or the like.

The lithium secondary battery according to the present invention may be used in a battery cell used as a power supply of small devices, but may also be preferably used as a unit battery in a medium to large sized battery module including a plurality of battery cells. Preferred examples of the medium to large sized device may include electric vehicles, hybrid electric vehicles, plug-in hybrid electric vehicles, systems for power storage and the like, but are not limited thereto.

Hereinafter, the present invention will be described in detail with reference to examples in order to specifically describe the present invention. However, the examples of the present invention may be modified to various other forms and the scope of the present invention shall not be interpreted to be limited to the examples described below. The examples of the present invention are provided in order to more completely describe the present invention for those having average knowledge in the art.

Example 1

1) Preparation of Graphite with First Coating Layer Formed Thereon

An amorphous carbon material precursor (pitch-based) was added to natural graphite and coated using a ball mill, and then the result was heat treated at 1200° C. to prepare graphite with a first coating layer including an amorphous carbon material formed thereon. A coating amount of the first coating layer in the prepared first coating layer-formed graphite was 4%.

2) Preparation of Nitrogen-Doped Graphene

Graphene was added to an aqueous sulfuric acid solution to be oxidized, and then reduced by adding hydrazine, and the result was heat treated at 1000° C. to prepare nitrogen-doped graphene. Herein, the doping amount of the nitrogen was 5 mol % with respect to carbon atoms of the graphene.

3) Preparation of Negative Electrode Active Material with First Coating Layer and Second Coating Layer Formed Therein A graphite mixture binding the first coating layer and a second coating layer through electrostatic attraction was prepared by adding and reacting the first coating layer-formed graphite prepared in 1) and the nitrogen-doped graphene prepared in 2) in an aqueous ammonia solution having a pH of 8. Herein, the first coating layer had a negative charge (−) in the alkaline solution and the second coating layer had a positive charge (+) in the alkaline solution, and thereby bound to each other through electrostatic attraction. The prepared graphite mixture was heat treated at 1000° C. to prepare a negative electrode active material with the first coating layer and the second coating layer formed therein (negative electrode active material having double coating layer). FIG. 1 is a diagram schematically showing the preparation method.

4) Manufacture of Lithium Secondary Battery

The prepared negative electrode active material and carboxymethylcellulose/styrene-butadiene rubber were mixed in a weight ratio of 95:5 to prepare negative electrode active material slurry, and the prepared negative electrode active material slurry was applied to a uniform thickness on a top surface of one side of a copper thin film having a thickness of 16 μm, and the result was dried and pressed to prepare a negative electrode having a negative electrode active material layer.

With lithium metal as a positive electrode, an electrode assembly was prepared by placing a cell guard, a separator, between the negative electrode and the positive electrode, and laminating the result. After that, an electrolyte liquid dissolving 1M $LiPF_6$ in a mixed solvent of propylene carbonate (PC), ethylmethyl carbonate (EMC) and ethylene carbonate (EC) (PC:EMC:EC=2:3:5) was injected thereto to manufacture a lithium secondary battery for tests.

Example 2

A lithium secondary battery was manufactured in the same manner as in Example 1, except that nitrogen-doped carbon nanotubes were prepared using carbon nanotubes instead of the graphene in Example 1-2), and this was used instead of the nitrogen-doped graphene in Example 1-3).

Comparative Example 1

A lithium secondary battery was manufactured in the same manner as in Example 1, except that natural graphite (the same natural graphite used in Example 1) itself was used as the negative electrode active material.

Comparative Example 2

A lithium secondary battery was manufactured in the same manner as in Example 1, except that Example 1-3) was not carried out, and the first coating layer-formed graphite of Example 1-1) was used as the negative electrode active material.

Comparative Example 3

A lithium secondary battery was manufactured in the same manner as in Example 1, except that graphene was added to the first coating layer-formed graphite prepared in Example 1-1) and coated using a ball mill, and the result was heated at 1000° C. to prepare the negative electrode active material with a first coating layer and a second coating layer formed therein.

Test Example 1

Low temperature output properties of the lithium secondary batteries prepared in Examples 1 and 2, and Comparative Examples 1 to 3 were compared and analyzed.

After each lithium secondary battery was stored for 3 hours in a chamber at −30° C. to lower a temperature of the each lithium secondary battery to −30° C., a current corresponding to a 5 C rate was applied for 6 seconds, and an output property of the lithium secondary battery was measured.

Figure 2:
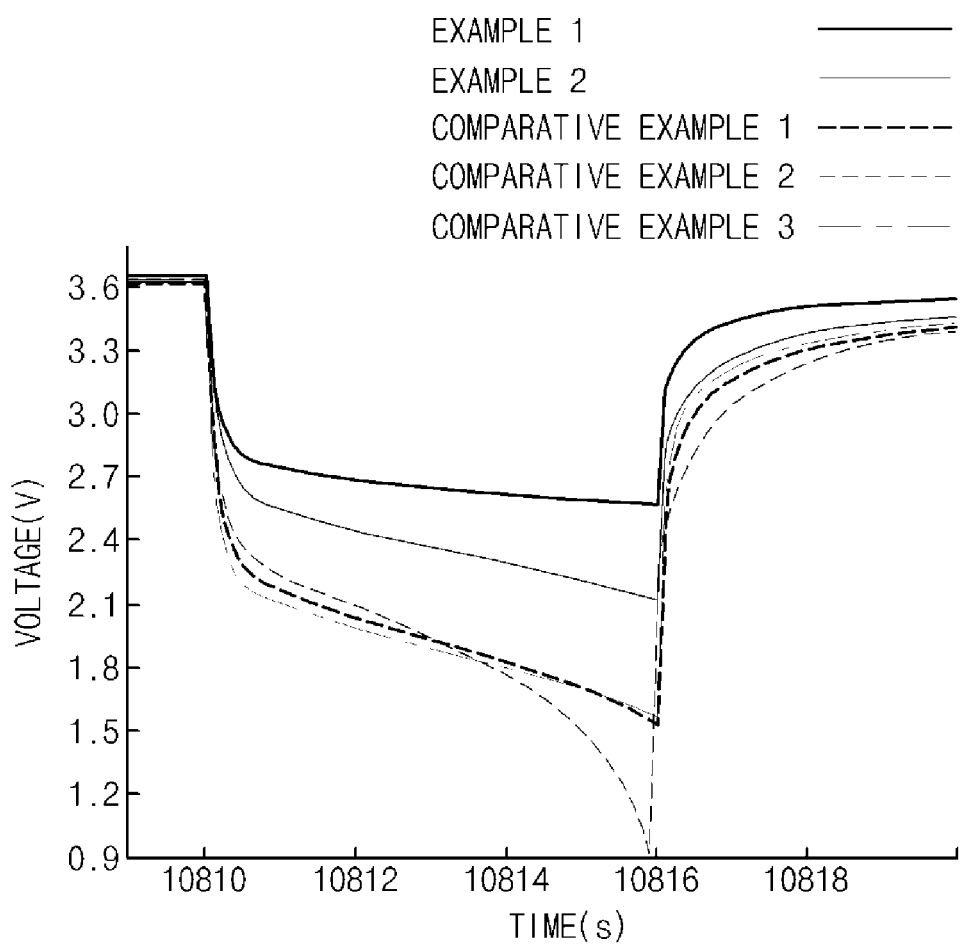
FIG. 2 is a graph showing results of analyzing a low temperature output property of a lithium secondary battery using a negative electrode active material having a double coating layer of a first coating layer and a second coating layer according to one embodiment of the present invention.

As shown in FIG. 2, low temperature output properties of the lithium secondary batteries of Example 1 and Example 2 using a negative electrode active material having a double coating layer of a first coating layer and a second coating layer according to the present invention were significantly superior compared to the lithium secondary battery using a negative electrode active material that does not have a coating layer (Comparative Example 1), the lithium secondary battery using a negative electrode active material having only a first coating layer that is an amorphous carbon material (Comparative Example 2), and the lithium secondary battery using a negative electrode active material having a first coating layer and a second coating layer without the first coating layer and the second coating layer binding through electrostatic attraction (Comparative Example 3).

Test Example 2

OCV drop phenomena of the lithium secondary batteries of Examples 1 and 2 and Comparative Examples 1 to 3 were compared and analyzed.

Figure 3:
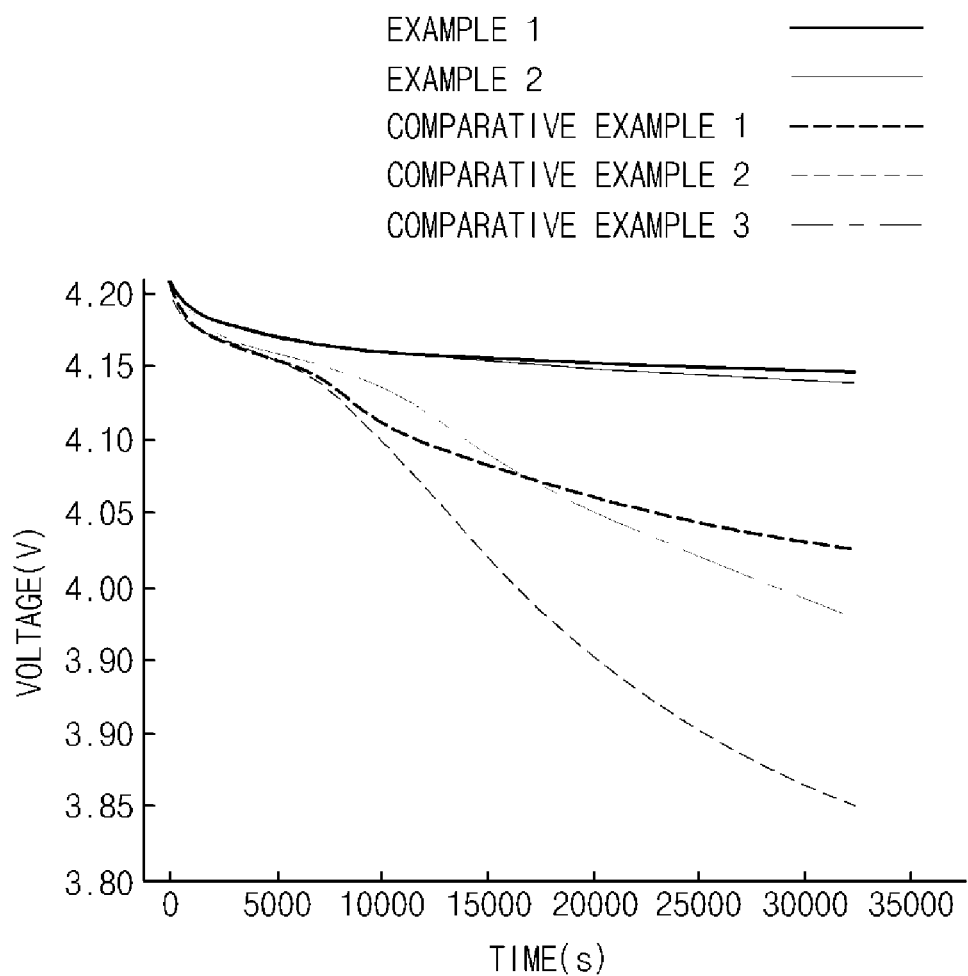
FIG. 3 is a graph showing results of analyzing a phenomenon of an OCV drop of a lithium secondary battery using a negative electrode active material having a double coating layer of a first coating layer and a second coating layer according to one embodiment of the present invention.

Each lithium secondary battery was charged up to 4.2 V, and changes in the open circuit voltage (OCV) of the battery were observed for 9 hours at 60° C. As shown in FIG. 3, the lithium secondary batteries using a negative electrode active material having a double coating layer of a first coating layer and a second coating layer according to the present invention had a significantly suppressed OCV drop compared to the lithium secondary battery using a negative electrode active material that does not have a coating layer (Comparative Example 1), the lithium secondary battery using a negative electrode active material having only a first coating layer that is an amorphous carbon material (Comparative Example 2), and the lithium secondary battery using a negative electrode active material having a first coating layer and a second coating layer without the first coating layer and the second coating layer binding through electrostatic attraction (Comparative Example 3).

What is claimed is:

1. A negative electrode active material comprising:
   a graphite core; and
   a double coating layer including a first coating layer and a second coating layer,
   wherein the first coating layer consists of an amorphous carbon material formed on the graphite core; and
   the second coating layer includes carbon particles doped with nitrogen formed on the first coating layer,
   wherein the first coating layer and the second coating layer are bound to each other by electrostatic attraction,
   wherein the nitrogen is doped in 3 mol % to 7 mol % with respect to carbon atoms of the carbon particles for providing the carbon particles a positive charge to bind the first and second coating layers, and
   wherein the amorphous carbon material has an average particle diameter (D50) of 4 μm to 9 μm.

2. The negative electrode active material of claim 1, wherein the graphite core is artificial graphite, natural graphite or a combination thereof.

3. The negative electrode active material of claim 1, wherein the graphite core has an average particle diameter ($D_{50}$) of 8 μm to 20 μm.

4. The negative electrode active material of claim 1, wherein a coating amount of the first coating layer is greater than 1 wt % and less than or equal to 6 wt % based on a total weight of the negative electrode active material.

5. The negative electrode active material of claim 1, wherein the amorphous carbon material is derived from a carbon precursor including one or more types selected from the group consisting of sucrose, a phenol resin, a naphthalene resin, polyvinyl alcohol, polyvinyl chloride, furfuryl alcohol, polyacrylonitrile, polyamide, a furan resin, cellulose, styrene, polyimide, an epoxy resin, coal-based pitch, petroleum-based pitch, mesophase pitch, tar and low molecular weight heavy oil.

6. The negative electrode active material of claim 1, wherein the amorphous carbon material has a specific surface area of 7 $m^2/g$ to 15 $m^2/g$ and average lattice plane spacing $d_{002}$ of 0.3470 to 0.3520.

7. The negative electrode active material of claim 1, wherein a coating amount of the second coating layer is greater than 1 wt % and less than or equal to 3 wt % based on a total weight of the negative electrode active material.

8. The negative electrode active material of claim 1, wherein the carbon particles are graphene, carbon nanotubes or a combination thereof.

9. The negative electrode active material of claim 8, wherein the graphene has a specific surface area of 80 $m^2/g$ to 120 $m^2/g$ and electron mobility of 1500 S/cm to 3000 S/cm.

10. The negative electrode active material of claim 8, wherein the carbon nanotubes have a specific surface area of 35 $m^2/g$ to 50 $m^2/g$, an average diameter of 50 nm to 200 nm, and an average major axis length of 500 nm to 3 μm.

11. A negative electrode comprising the negative electrode active material of claim 1.

12. A lithium secondary battery comprising:
   the negative electrode of claim 11;
   a positive electrode; and
   a separator provided between the negative electrode and the positive electrode.

13. A method for preparing the negative electrode active material of claim 1, the method comprising:
   1) preparing graphite with a first coating layer formed thereon by coating a graphite core with an amorphous carbon material precursor and heat treating the result;
   2) preparing a graphite mixture with a second coating layer formed on the first coating layer by adding the first coating layer-formed graphite and nitrogen-doped carbon material particles to an aqueous alkaline solution and mixing the result; and
   3) heat treating the graphite mixture.

14. The method for preparing the negative electrode active material of claim 13, wherein the heat treatment of the step 1) is carried out in a temperature range of 700° C. to 1500° C.

15. The method for preparing the negative electrode active material of claim 13, wherein the amorphous carbon material precursor is derived from a carbon precursor including one or more types selected from the group consisting of sucrose, a phenol resin, a naphthalene resin, polyvinyl alcohol, polyvinyl chloride, furfuryl alcohol, polyacrylonitrile, polyamide, a furan resin, cellulose, styrene, polyimide, an epoxy resin, coal-based pitch, petroleum-based pitch, mesophase pitch, tar and low molecular weight heavy oil.

16. The method for preparing the negative electrode active material of claim 13, wherein the aqueous alkaline solution of the step 2) has a pH of 8 to 9.

17. The method for preparing the negative electrode active material of claim 13, wherein the nitrogen doped carbon particles of the step 2) is prepared by injecting ammonia gas during carbon particle synthesis carried out through chemical vapor deposition.

18. The method for preparing the negative electrode active material of claim 13, wherein the nitrogen doped carbon particles of the step 2) is prepared by adding carbon particles to a strong acidic solution to oxidize the particles, and then reducing the particles by adding a reducing agent.

19. The method for preparing the negative electrode active material of claim 18, wherein the reducing agent is hydrazine, ammonia or a combination thereof.

20. The method for preparing the negative electrode active material of claim 13, wherein the heat treatment of the step 3) is carried out in a temperature range of 800° C. to 1000° C.

\* \* \* \* \*